United States Patent Office 3,073,610
Patented Jan. 15, 1963

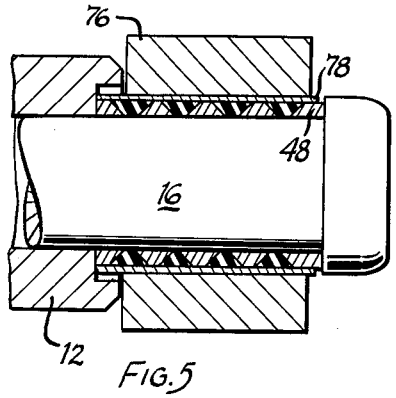
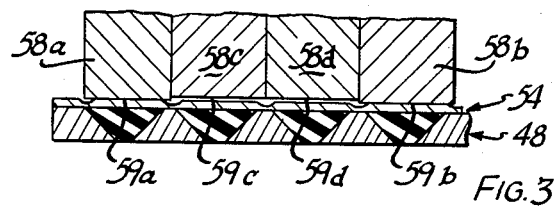
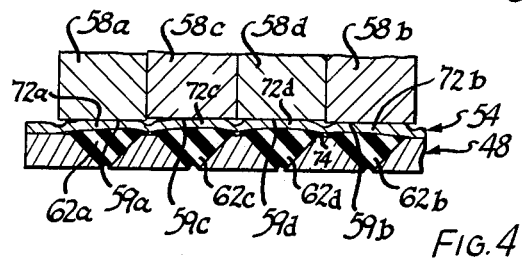
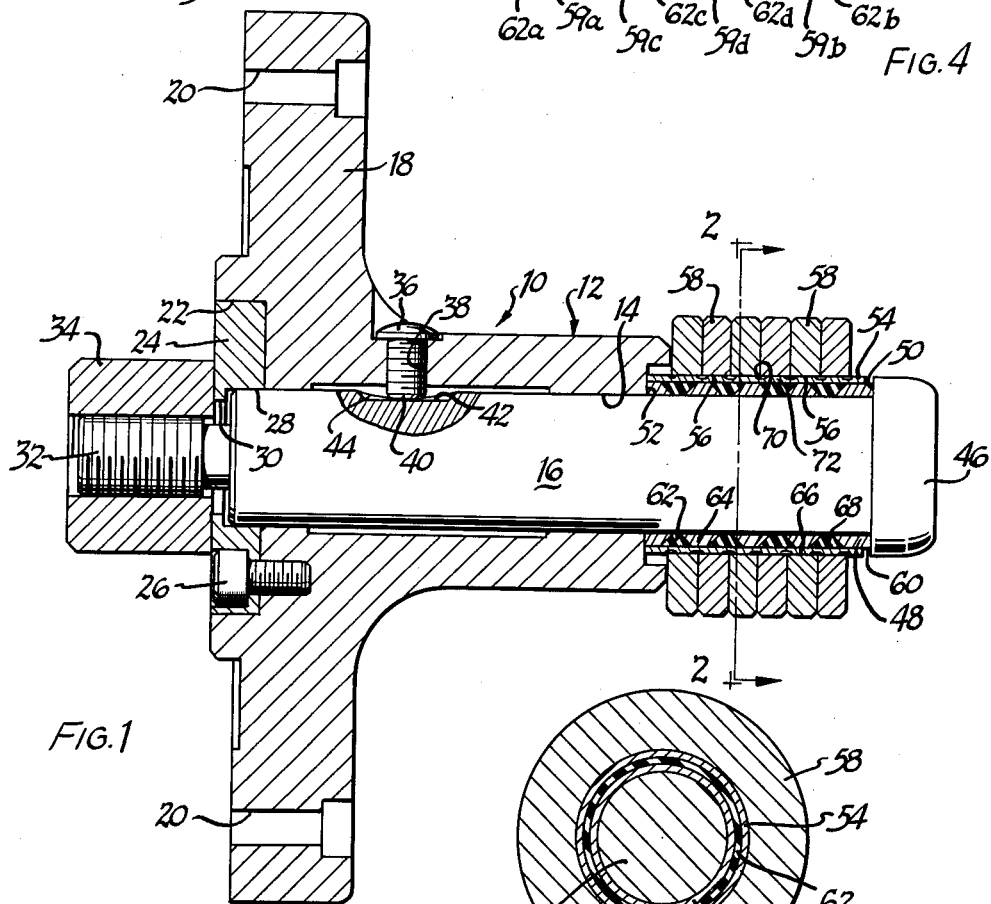
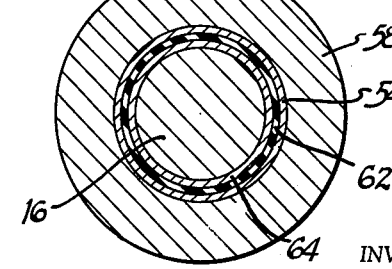

3,073,610
EXPANDING ARBOR
Harold C. Mackinder, Livonia, and Theodore Zywicki, Dearborn, Mich., assignors to Lincoln Park Engineering, Inc., Romulus, Mich., a corporation of Michigan
Filed Oct. 19, 1961, Ser. No. 146,240
9 Claims. (Cl. 279—2)

This invention relates to an expanding arbor, and more particularly to an expanding arbor adapted to receive and hold a plurality of elements having bores with diameters which vary within a given tolerance.

It is frequently necessary to do work on the outer periphery of a work piece having a bore therethrough. Additionally, it is frequently desirable to work simultaneously on a plurality of such elements. The elements may be, for example, bushings, piston rings and the like. The method commonly used for mounting such elements in a machine is to insert an expanding arbor through the bores of the elements and then expand the arbor to clamp the elements thereto.

One o fthe problems encountered in such a clamping technique is that most expanding arbors expand at a uniform rate throughout the entire length of the arbor. However, normally the bore diameters of several elements will not be exactly the same. There is usually a slight difference among the different diameters, resulting in some of the elements having larger or smaller diameters than the others. The difference in the diameters is commonly of the order of from .001 to .003 of an inch. It will be appreciated that if the arbor expands uniformly throughout its length, clamping of the elements having the smallest diameters will tend to prevent further expansion of the arbor to clamp the elements having somewhat larger diameters.

The present invention solves this problem by providing an expanding arbor which can expand at a non-uniform rate along its length and which is relatively inexpensive to manufacture.

An object of the invention is to provide an expanding arbor.

Another object of the invention is to provide an expanding arbor which can expand an uneven amount along its length.

A further object of the invention is to provide an expansion medium for the arbor which can expand non-uniformly along its length.

A further object is to provide an expansion medium which will automatically retract when it is desired to remove the work piece from the arbor.

A still further object of the invention is to provide, in one embodiment, a mandrel received on the expansion medium which is also capable of expanding or deforming in a non-uniform fashion.

Other objects of this invention will appear in the following description and appended claims, reference being had to the accompanying drawings forming a part of this specification wherein like reference characters designate corresponding parts in the several views.

In the drawings:

FIGURE 1 is a side elevational view in section of one embodiment of the present invention;

FIGURE 2 is a sectional view taken substantially along the line 2—2 of FIGURE 1 looking in the direction of the arrows;

FIGURE 3 is a partial view of the arbor on a larger scale than FIGURE 1 showing the condition of the arbor before expansion thereof;

FIGURE 4 is a view similar to FIGURE 3 illustrating the arbor after expansion; and FIGURE 5 is a view of a portion of the arbor illustrating the provision of a mandrel thereon for clamping a single work piece.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to FIGURE 1, the expanding arbor 10 includes a support member 12 having a bore 14 which slidingly receives a spindle 16. The member 12 has a hub 18 at one end with countersunk openings 20 to receive cap screws for securing the arbor to a support structure on, for example, a grinding machine. Alternately, the hub 18 may be replaced with a shank end for securing the device in a lathe chuck or other gripping means for rotary motion.

The hub 18 has a recess 22 which receives a circular insert 24 secured to the hub by a cap screw 26. An opening is provided in the insert 24 having a first enlarged portion 28 which slidingly receives the inner end of the spindle 16 and a second portion 30 of reduced diameter through which projects a threaded stud 32 provided on the inner end of spindle 16. A nut 34 is threadingly received on the stud 32. The nut 34 serves as an actuating medium to move the spindle 16 axially as will be explained hereinafter in connection with operation of the arbor.

The spindle 16 is prevented from rotating with respect to the support member 12 by engagement with a screw 36. The screw 36 is threadingly engaged in opening 38 provided in the member 12. The end 40 of the screw projects into the bore of the member 12 and is received in an elongated slot 42 provided in the outer periphery of the spindle 16. Elongation of the slot 42 permits axial movement of the spindle 16. However, rotation of the spindle 16 is prevented by engagement of the end 40 with the sides 44 of the slot. When it is desired to remove the spindle from the member 12, the screw 36 is threaded out of engagement with the slot 42.

The spindle 16 projects out of the member 12 and terminates in an enlarged head 46. An inner sleeve 48 is received on the outwardly projecting portion of the spindle. The sleeve 48 serves as an expansion medium in operation of the arbor. The sleeve 48 normally abuts at one end against the shoulder 50 formed by the enlarged head 46 and at the other end against the end surface 52 of the member 12. A second or outer thin-walled sleeve 54 is received on the inner sleeve 48. The sleeve 54 serves as an expanding mandrel to frictionally engage the inner peripheral surfaces 56 of work pieces 58. As will be noted, there is a slight clearance 60 between the ends of outer sleeve 54 and the shoulder 50. This clearance permits axial movement of the spindle 16 and enlarged head 46 without engaging the sleeve 54.

As previously mentioned, the inner sleeve 48 forms the expansion medium for the arbor. The sleeve 48 comprises alternate rubber rings 62 and metallic rings 64, each having a triangular cross-section. The rings 62, 64 are bonded together to form an integral structure. The term rubber is defined herein as either a natural or synthetic material having rubber-like characteristics. Similarly, the metallic rings can be constructed of any material having the hard, relatively non-compressible characteristics of metal.

In operation of the arbor, the sleeve 48 is adapted to be compressed between the shoulder 50 and surface 52 as a result of axial movement of the spindle 16. The spindle 16 may be moved axially by manual threading of the nut 34 or, alternately, a power device such as an hydraulic cylinder may be attached to the spindle for power actuation thereof. As will be noted, the apexes 66 of the metal rings 64 are positioned on the outer periphery of the sleeve 48 and the apexes 68 of the rubber rings are positioned on the inner periphery of the sleeve. This configuration positions the main mass of the rubber rings adjacent to the outer sleeve 54. Additionally, the forces exerted on the rubber rings 62 by the metallic rings 64 during compression of the sleeve are in directions tending to deform the rubber outwardly towards the outer sleeve 54. Thus, the main mass of rubber and the direction of deformation is towards the outer sleeve 54.

Bonding of the side surfaces of the rubber rings 62 to the side surfaces of the metallic rings 64 is preferably accomplished by molding these parts together with subsequent machining of the sleeve to obtain the desired dimensions. Bonding of the rings together is important in operation of the arbor because it prevents the usual wedge action between the rings. The engaged side surfaces of the rings, being bonded together, will not slip relative to each other. This forces the rubber to deform in the direction of the sleeve 54 rather than to move in the direction of the sleeve. As a consequence, due to the elastic nature of rubber, after the compressive force is removed from the sleeve 48, the rubber will return to its natural shape and thus automatically release the work pieces which are mounted on the arbor.

As will be noted, the outer sleeve 54 has spaced apart annular grooves 70 in the outer periphery thereof. The grooves 70 weaken the sleeve and permit flexing of the sleeves at the location of each groove. In essence, this permits individual expansion of each of the segments 72 between the grooves. This is important when a plurality of work pieces 58 are to be clamped simultaneously on the arbor. Normally, the work pieces will not have bores of exactly the same diameter. In order to clamp each of the work pieces, it is necessary to have a non-uniform expansion of the sleeve 54 to compensate for the differences in diameter.

Operation of the arbor may be more clearly understood by reference to FIGURES 3 and 4. FIGURE 3 represents the arbor before clamping of the work pieces 58 and FIGURE 4 represents the arbor after clamping the work pieces. As will be noted in FIGURE 3, the diameter of bores 59a and 59b is slightly smaller than the diameter of bores 59c and 59d. However, as will be noted in FIGURE 4, each of the bores is contacted and frictionally engaged upon axial compression of the sleeve 48 and expansion of the sleeve 54. The rubber rings 62a and 62b do not deform quite as much as the rings 62c and 62d. The greater deformation of the ring 62c and 62d forces the sleeve segments 72c and 72d into engagement with the inner periphery of the work pieces 58c and 58d even though the diameters thereof are slightly larger than the diameters of the bores of the pieces 58a and 58b. Another feature to be noted in FIGURE 4 is that when the rubber rings deform, the rubber tends to spill, as at 74, over the apexes of the metal rings to thus provide a relatively continuous surface in contact with the inner periphery of the sleeve 54. The sleeve 54, in turn, expands in a relatively uniform manner to contact the inner periphery of the work pieces along substantially the entire outer peripheral surfaces of the sleeve segments 72. This results in a more firm clamping of the work pieces.

As shown in FIGURE 5, where only one work piece 76 is to be mounted on the arbor, the sleeve 78 may be provided without grooves in the outer periphery thereof. As will be appreciated, a single work piece will have a uniform bore diameter and there is no necessity for non-uniform expansion of the sleeve 78.

Having thus described our invention, we claim:

1. In an expanding arbor for gripping a work piece having a substantially cylindrical bore therethrough, an inner sleeve comprising alternate rubber rings and metallic rings bonded together to form a unitary structure; each of said rings having a substantially triangular cross-section; the apexes of the rubber rings being positioned on the inner periphery of the sleeve and the apexes of the metallic rings being positioned on the outer periphery of the sleeve whereby a compressive axial force exerted on the ends of the sleeve will cause radially outward deformation of the rubber rings; and an expansible outer sleeve received on the inner sleeve responsive to deformation of the rubber rings to deform radially outwardly to grip a work piece inserted thereon.

2. An expanding arbor comprising a substantially cylindrical member comprising alternate circular rubber elements and circular metallic elements; each of said elements having a pair of side surfaces; the side surfaces of adjacent elements being adhered to each other to form a unitary structure; the side surfaces of each rubber element diverging outwardly away from each other towards the outer periphery thereof; the side surfaces of each metallic element converging inwardly towards each other and towards the outer periphery thereof whereby a compressive axial force exerted on the ends of the sleeve will cause radially outward deformation of the rubber elements; and as expansible sleeve received on said cylindrical member which is deformed outwardly upon deformation of said rubber elements.

3. An expanding arbor for gripping at least one work piece having a substantially cylindrical bore therethrough comprising an inner sleeve comprising alternate rubber rings and metallic rings bonded together to form a unitary structure; each of said rings having a substantially triangular cross-section; the apexes of the rubber rings being positioned on the inner periphery of the sleeve and the apexes of the metallic rings being positioned on the outer periphery of the sleeve whereby a compressive axial force exerted on the ends of the sleeve will cause radially outward deformation of the rubber rings; and an expansible outer sleeve received on the inner sleeve; said outer sleeve having spaced apart annular grooves in the outer periphery thereof whereby the sleeve portions between the grooves may be expanded non-uniformly with respect to each other; said outer sleeve being responsive to deformation of the rubber rings to deform radially outwardly.

4. An expanding arbor comprising a substantially cylindrical member comprising alternate circular rubber elements and circular metallic elements; each of said elements having a pair of side surfaces; the side surfaces of adjacent elements being adhered to each other to form a unitary structure; the side surfaces of each rubber element diverging outwardly away from each other towards the outer periphery thereof; the said surface of each metallic element converging inwardly towards each other and towards the outer periphery thereof whereby a compressive axial force exerted on the ends of the sleeve will cause radially outward deformation of the rubber elements; and an expansible sleeve received on said cylindrical member; said expansible sleeve being weakened at longitudinally spaced portions; the sleeve portions between the weakened portions being expandable non-uniformly with respect to each other; said expansible sleeve being deformed outwardly upon deformation of said rubber elements.

5. An expansion element for an expanding arbor comprising alternate rubber rings and metallic rings bonded together to form a unitary structure; each of said rings having a substantially triangular cross-section; the apexes of the rubber rings being positioned on the inner periphery of the expansion element and the apexes of the metallic rings being positioned on the outer periphery of the expansion element whereby a compressive axial force exerted on the ends of said element will cause radially outward deformation of the rubber rings.

6. An expansion element for an expanding arbor comprising a substantially cylindrical member comprising alternate circular rubber elements and circular metallic elements; each of said elements having a pair of side surfaces; the side surfaces of adjacent rubber and metallic elements being adhered to each other to form a unitary structure; the side surfaces of each rubber element diverging outwardly away from each other towards the outer periphery thereof; the side surfaces of each metallic element converging inwardly towards each other and towards the outer periphery thereof whereby a compressive axial force exerted on the ends of said expansion element will cause radially outward deformation of the rubber elements.

7. In an expanding arbor, an expansible sleeve; said sleeve being weakened at longitudinally spaced portions; the sleeve portions between the weakened portions being expandable non-uniformly with respect to each other; and expansion means interior of said sleeve to provide a uniform radial pressure against the entire inner periphery of the sleeve to differentially expand the sleeve for simultaneously gripping each of a plurality of work pieces mounted thereon and having substantially cylindrical bores of slightly varying diameters.

8. An expanding arbor for gripping a work piece having a substantially cylindrical bore therethrough comprising a support member having a bore therein; a spindle slidingly received in said bore; a portion of the spindle extending out of the support member; an inner sleeve received on said last mentioned portion of the spindle; said inner sleeve abutting at one end against structure of the support member and abutting at the other end against structure of the spindle; said inner sleeve comprising alternate rubber rings and metallic rings adhered together to form a unitary structure; each of said rings having a substantially triangular cross-section; the apexes of the rubber rings being positioned on the inner periphery of the sleeve and the apexes of the metallic rings being positioned on the outer periphery of the sleeve; an outer expansible sleeve received on the inner sleeve; and means to move the spindle axially into the support member to compress the inner sleeve and cause outward deformation of the rubber rings into engagement with the outer sleeve to expand the outer sleeve and cause it to grip the inner periphery of a work piece mounted thereon.

9. An expanding arbor for gripping at least one work piece having a substantially cylindrical bore therethrough comprising a support member having a bore therein; a spindle slidingly received in said bore; a portion of the spindle extending out of the support member; an inner sleeve received on said last mentioned portion of the spindle; said inner sleeve abutting at one end against structure of the support member and abutting at the other end against structure of the spindle; said inner sleeve comprising alternate rubber rings and metallic rings adhered together to form a unitary structure; each of said rings having a substantially triangular cross-section; the apexes of the rubber rings being positioned on the inner periphery of the sleeve and the apexes of the metallic rings being positioned on the outer periphery of the sleeve; an outer expansible sleeve received on the inner sleeve; said outer sleeve having spaced apart annular grooves in the outer periphery thereof whereby the sleeve portions between the grooves may be expanded non-uniformly with respect to each other; and means to move the spindle axially into the support member to compress the inner sleeve and cause outward deformation of the rubber rings into engagement with the outer sleeve to expand the outer sleeve and cause it to grip a work piece mounted thereon.

References Cited in the file of this patent

UNITED STATES PATENTS

| 2,466,974 | Stupakoff | Apr. 12, 1949 |
| 2,573,928 | Peter | Nov. 6, 1951 |
| 2,647,701 | Cannard | Aug. 4, 1953 |

FOREIGN PATENTS

| 610,079 | Great Britain | Oct. 11, 1948 |